(12) United States Patent
Kratish et al.

(10) Patent No.: US 6,409,140 B1
(45) Date of Patent: *Jun. 25, 2002

(54) TOOL FOR HANGING A FRAME

(76) Inventors: Martin L. Kratish, 5200 SW. 115th Ave., Cooper City, FL (US) 33330; Lawrence Kratish, 8741 Lake Dasha Terr, Plantation, FL (US) 33324

( * ) Notice: Subject to any disclaimer, the term of this patent is extended or adjusted under 35 U.S.C. 154(b) by 0 days.

This patent is subject to a terminal disclaimer.

(21) Appl. No.: 09/504,593

(22) Filed: Feb. 15, 2000

Related U.S. Application Data

(63) Continuation-in-part of application No. 09/192,748, filed on Nov. 16, 1998, which is a continuation-in-part of application No. 08/970,598, filed on Nov. 14, 1997, now Pat. No. 5,927,675, which is a continuation-in-part of application No. 08/795,251, filed on Feb. 10, 1997, now abandoned.

(51) Int. Cl.7 ............... A47F 1/14; A47F 7/14; A47G 1/16; A47G 1/06; B60K 1/02
(52) U.S. Cl. ............ 248/466; 248/916; 248/475.1; 40/713
(58) Field of Search ................ 248/465, 460, 248/466, 470, 475.1, 477, 495, 496, 916; 40/713, 757; 33/613, 42

(56) References Cited

U.S. PATENT DOCUMENTS

| | | | |
|---|---|---|---|
| 1,005,499 A | | 10/1911 | Baker |
| 1,908,147 A | | 5/1933 | Hoegger |
| 2,641,527 A | | 6/1953 | Krogh |
| 2,952,431 A | | 9/1960 | Pedley |
| 4,212,123 A | | 7/1980 | Robin |
| 4,241,510 A | * | 12/1980 | Radecki ............... 33/613 |
| 4,295,625 A | | 10/1981 | Degger et al. |
| 4,597,554 A | | 7/1986 | James |
| 4,936,033 A | * | 6/1990 | Lacko ............... 40/765 |
| 5,080,317 A | * | 1/1992 | Letizia ............... 248/466 |
| 5,103,575 A | * | 4/1992 | Ehling ............... 33/613 |
| 5,303,895 A | | 4/1994 | Hart |
| 5,314,159 A | | 5/1994 | Szarata |
| 5,433,416 A | * | 7/1995 | Johnson ............... 248/475.1 |
| 5,758,858 A | * | 6/1998 | Barnes ............... 248/475.1 |
| 5,801,891 A | * | 9/1998 | Lloyd ............... 248/475.1 |
| 5,878,987 A | * | 3/1999 | Hayde ............... 248/477 |
| 5,906,349 A | * | 5/1999 | Roy ............... 248/496 |
| 5,915,806 A | * | 6/1999 | Levee ............... 33/42 |
| 5,927,675 A | * | 7/1999 | Kratish et al. ............... 248/466 |

* cited by examiner

Primary Examiner—Kimberly T. Wood
Assistant Examiner—Jerome A. Deluca
(74) Attorney, Agent, or Firm—Laurence A. Greenberg; Werner H. Stemer; Gregory L. Maybeck

(57) ABSTRACT

A frame hanging tool has an elongated body member formed with a plurality of openings. Each of the plurality of openings has an opening edge and a recessed border formed at least partly around the opening edge. The inserts have an overhanging edge that has a shape corresponding with the recessed border for removably fastening the inserts to the body member within the openings. The recessed border can have a protrusion and the overhanging edge can have a recess, or vice-versa, the recess aligned with and corresponding to the protrusion. The protrusion and the recess can be curved or linear in shape. A shape of the recessed border can correspond with or be slightly smaller than a shape of the overhanging edge. The overhanging edge can have a tapered corner for easier insertability. The inserts are each configured to receive and guide fasteners such as nails and screws. One insert includes a removable or fixed level positioned at any angle with respect to the frame hanging tool for indicating whether the fasteners received in the inserts are aligned level with respect to each other. The body member also can have a removable or fixed level. As such, a person is assured that the object being hung will be level with respect to the Earth. Another insert can have a gripping hole for releasably holding a fastener.

21 Claims, 9 Drawing Sheets

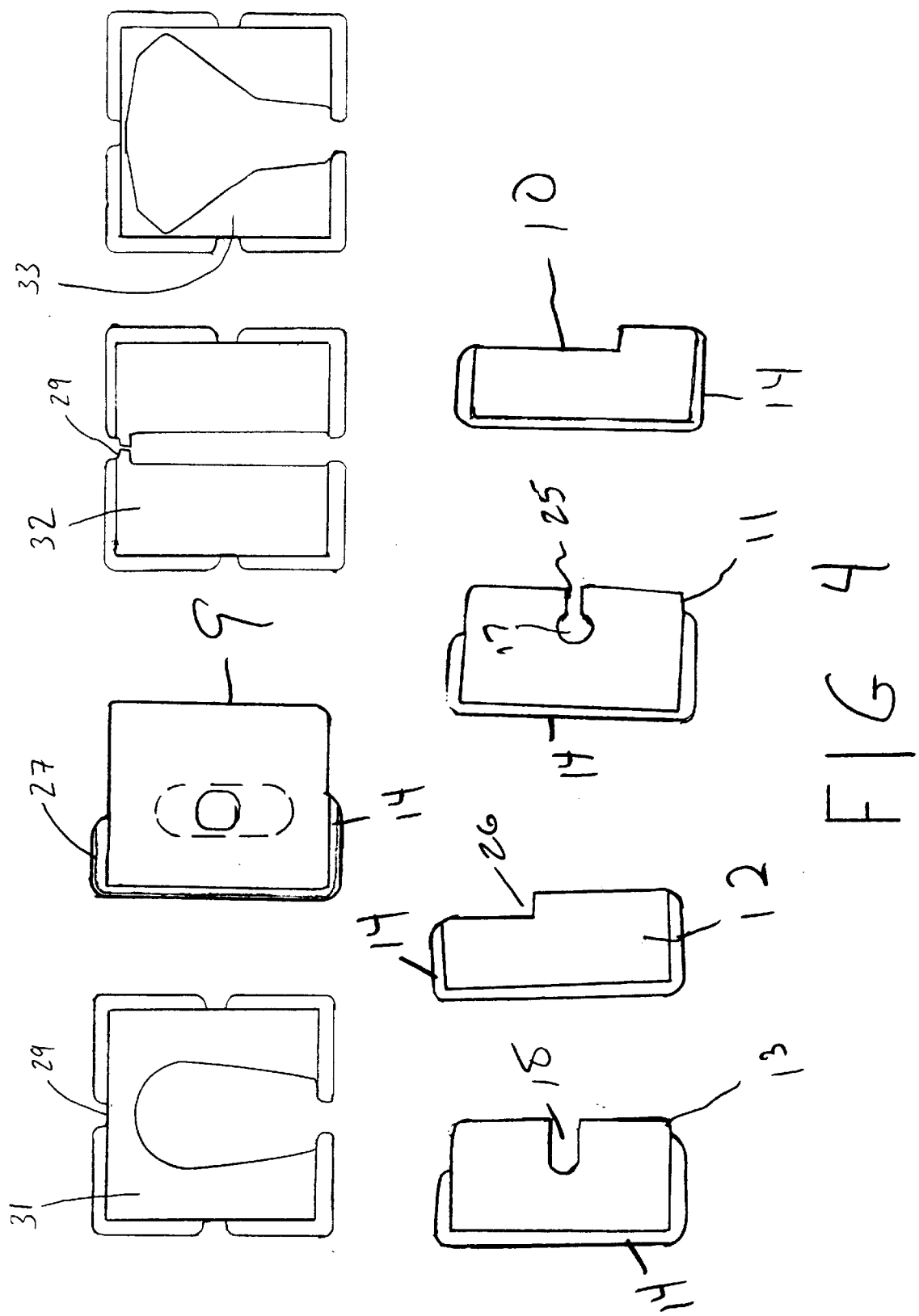

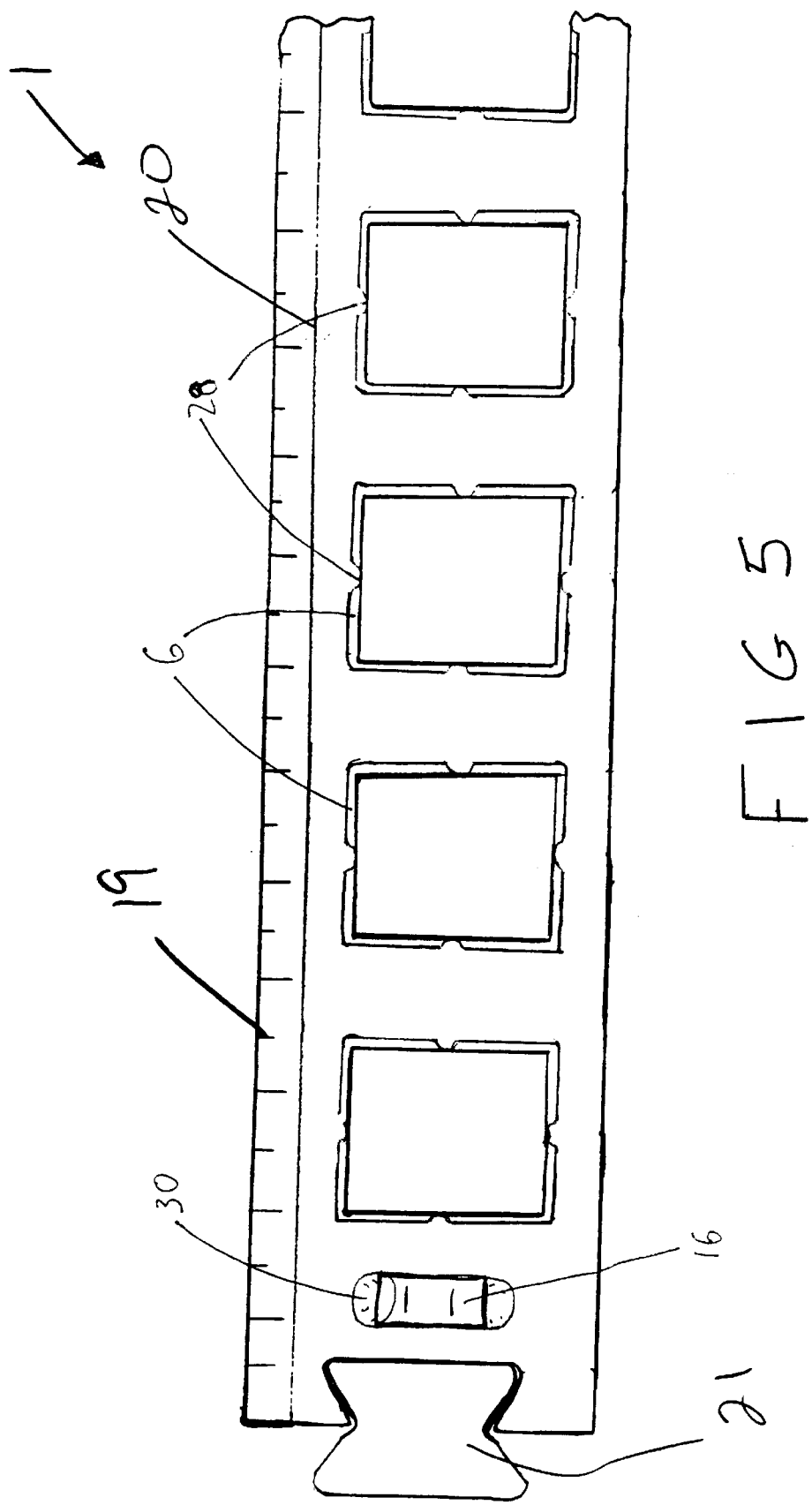

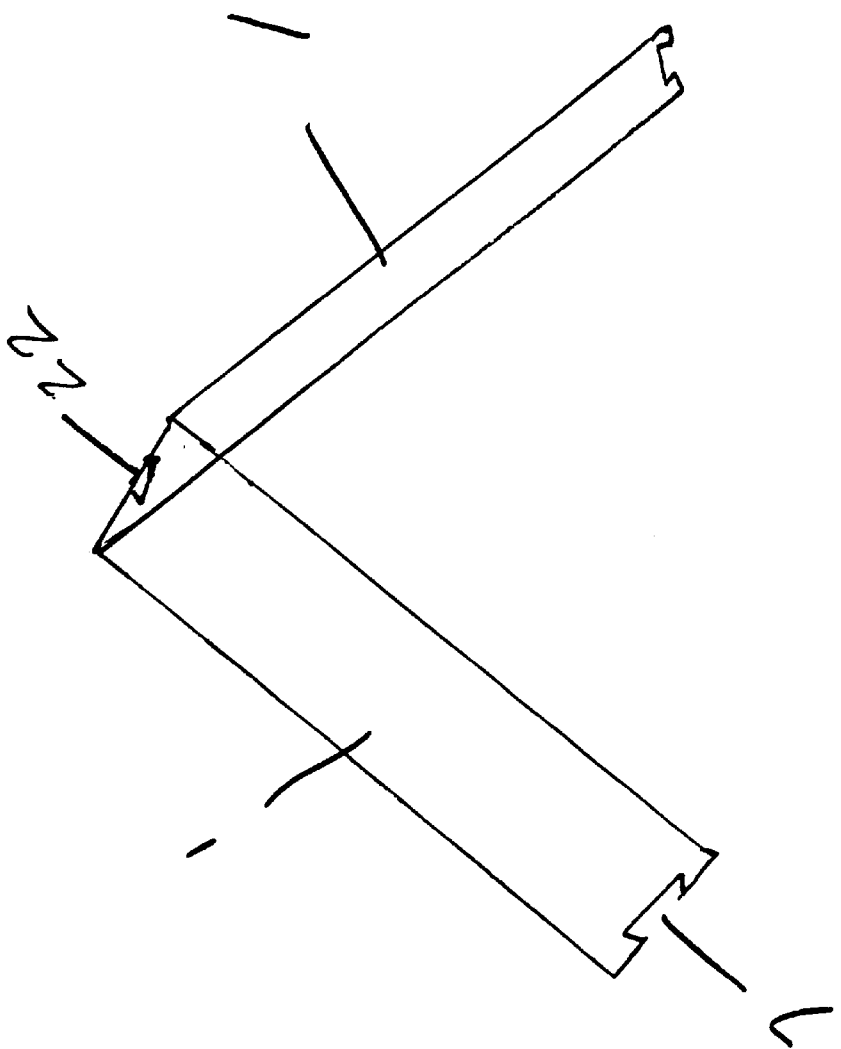

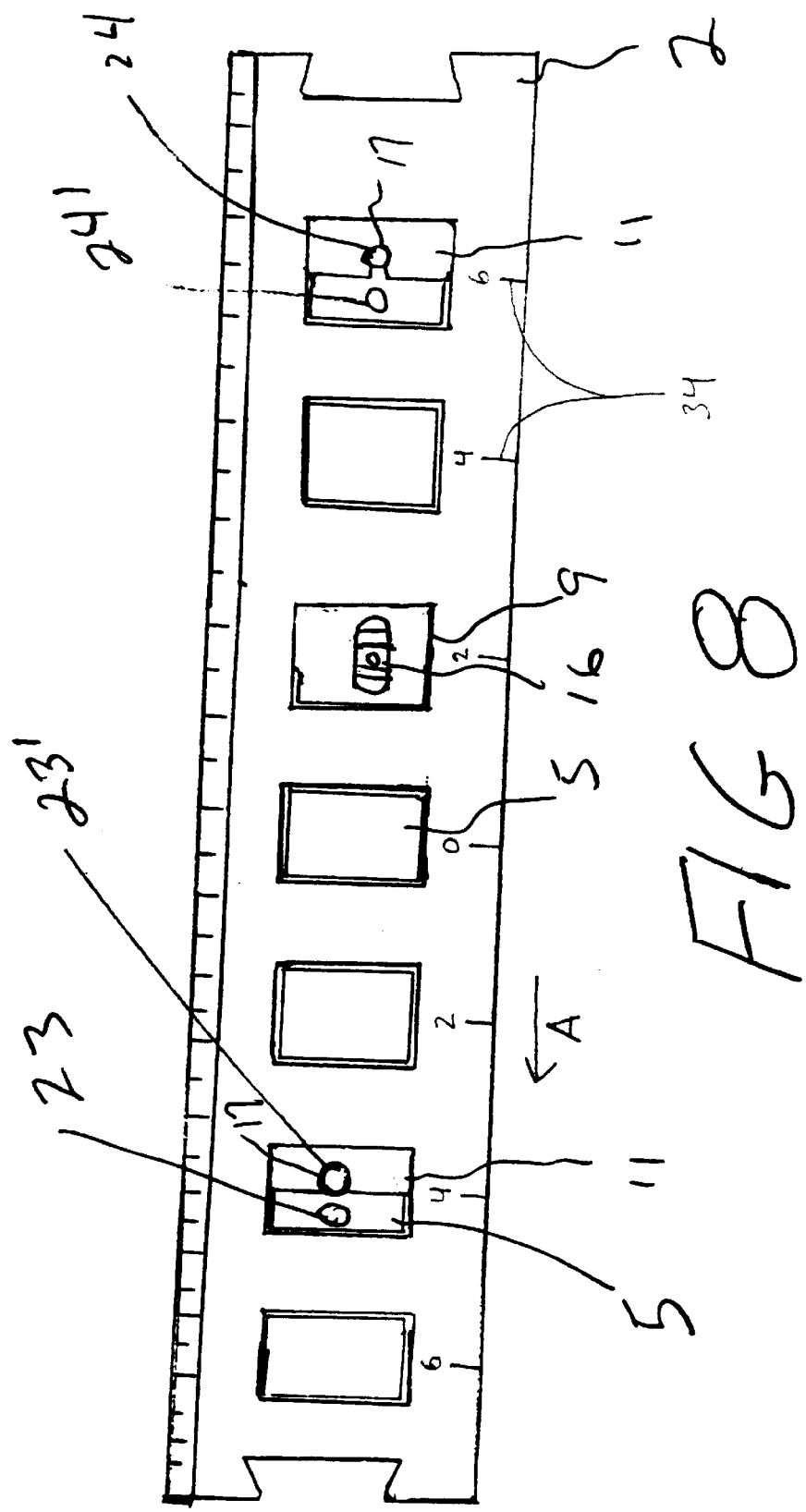

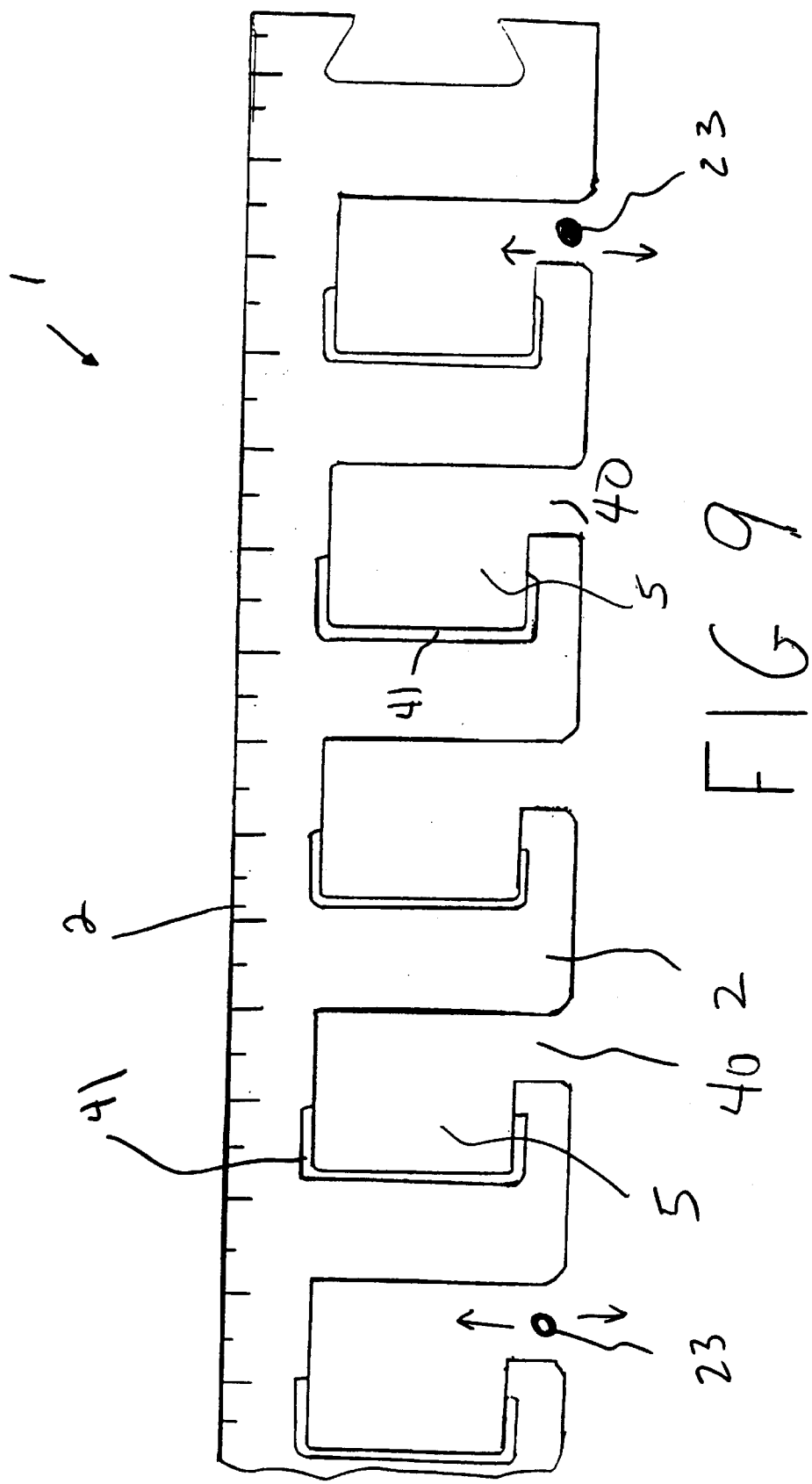

TOOL FOR HANGING A FRAME

CROSS-REFERENCE TO RELATED APPLICATION

This application is a continuation-in-part of application Ser. No. 09/192,748, filed Nov. 16, 1998, which is a continuation-in-part of application Ser. No. 08/970,598, filed 11/14/97, now U.S. Pat. No. 5,927,675, issued Jul. 27, 1999, which is a continuation-in-part of application Ser. No. 08/795,251, filed Feb. 10, 1997, now abandoned.

BACKGROUND OF THE INVENTION

1. Field of the Invention

The invention relates, generally, to a tool that assists in hanging an object on a structure, and more specifically, it relates to determining the placement of fasteners, such as nails, screws, pegs, mollies, hooks, and bull hooks, for hanging pictures, frames, carpets, sculptures, and the like, on a given plane and horizontal, vertical, or at a given angle with respect to one another.

2. Description of the Related Art

Various devices are known that assist in hanging pictures and like objects so that the object will hang level. However, there remains a need for an improved method for hanging objects, including framed works and similar items, that will hang securely in a level position.

U.S. Pat. No. 2,952,431 to Pedley teaches a cross bar which attaches to the back of a frame of an item to be hung on a wall. At the bottom of the frame there is secured an end piece into which the cross bar is held. The cross bar can be maneuvered within the confines of the end piece such that the frame can be leveled out should the frame initially be off center. The Pedley device requires time, effort and expense to secure the cross bar and the end piece to the frame.

U.S. Pat. No. 5,303,895 to Hart teaches an apparatus that is attached to a frame before the frame is mounted to a surface such as a wall. The Hart apparatus has a built in level for assisting in the proper placement of the apparatus on the frame. The apparatus contains areas in which fasteners may be inserted to attach the frame and the apparatus to the wall. The Hart device also requires time, effort and expense to secure the apparatus to the frame.

SUMMARY OF THE INVENTION

It is accordingly an object of the invention to provide a tool for hanging any object, including frames, that overcomes the herein-mentioned disadvantages of the heretofore-known devices and methods of this general type, that assists in hanging an object perfectly level on a surface, and that is easy to use and inexpensive to manufacture.

The invention is a tool that sets the proper placement of fasteners such as nails, screws, pegs, mollies, hooks, bull hooks, and the like for hanging objects such as pictures, frames, sculptures, and other items on the fasteners or devices attached to the fasteners. The invention may also be advantageously used to hang multiple objects on the same plane at an even or desired spacing, whether level with respect to ground or at a particular angle with respect to one another.

With the foregoing and other objects in view there is provided, in accordance with the invention, a frame hanging tool including an elongated body member having a plurality of openings formed therein, each of the plurality of openings having an opening edge and a recessed border formed at least partly around the opening edge, and at least one insert for receiving and guiding a fastener to be secured to a structure, the at least one insert having an overhanging edge and being inserted in one of the plurality of openings, the recessed border self-securing to the overhanging edge for removably fastening the at least one insert to the body member.

In accordance with an added feature of the invention, the recessed border is formed with at least one protrusion and the overhanging edge is formed with at least one recess aligned with and corresponding to the at least one protrusion for removably fastening the at least one insert to the body member.

In accordance with an additional feature of the invention, the overhanging edge has the at least one protrusion and the recessed border has the at least one recess aligned with and corresponding to the at least one protrusion for removably fastening the at least one insert to the body member.

In accordance with another feature of the invention, the recessed border has a depth and the at least one protrusion has a thickness corresponding to the depth of the recessed border.

In accordance with a further added feature of the invention, at least one protrusion and the at least one recess are curved.

In accordance with a further additional feature of the invention, the at least one protrusion has a length, the recessed border has a depth, and the length corresponds to the depth.

In accordance with yet another feature of the invention, the recessed border has a border shape, the overhanging edge has an edge shape, and the border shape substantially corresponds to the edge shape.

In accordance with yet another added feature of the invention, the recessed border has a border shape, the overhanging edge has an edge shape, and the edge shape is larger than the border shape.

In accordance with yet another additional feature of the invention, the overhanging edge has a tapered corner.

In accordance with an added feature of the invention, the at least one insert has a front side and a back side and the body member has a front side and a back side and the front and back sides of the at least one insert respectively lie flush with the front and back sides of the body member when the at least one insert is placed into the plurality of openings.

In accordance with an additional feature of the invention, the at least one insert is one of a plurality of inserts including a leveling insert having a level for determining if a plurality of fasteners are aligned level with respect to each other and a fastener guiding insert for receiving and aligning one of the plurality of fasteners.

In accordance with another feature of the invention, the leveling insert has a removable level.

In accordance with again an additional feature of the invention, the leveling insert has recess for receiving the level oriented at an angle.

In accordance with still another feature of the invention, the elongated body member has at least one cavity and includes at least one level removably disposed in the at least one cavity.

In accordance with still a further feature of the invention, the fastener guiding insert has a fastener guide path and a semicircular hole formed therein for receiving and guiding the fastener and the semicircular hole releasably grips the fastener.

In accordance with still an added feature of the invention, the body member has at least one end with an end opening formed therein and including an end connector received in the end opening of each of two adjacent body members for joining the adjacent body members at a given angle with respect to one another.

In accordance with a concomitant feature of the invention, the body member has a front side and a back side and the recessed border is formed at least partly around the opening edge on both the front side and the back side of the body member.

Other characteristic features of the invention are set forth in the appended claims.

Although the invention is illustrated and described herein as embodied in a tool for hanging a frame, it is nevertheless not intended to be limited to the details shown, because various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

BRIEF DESCRIPTION OF THE DRAWINGS

FIG. 4 is a diagrammatic, rear elevational view of some of the plurality of inserts of FIG. 3 and additional inserts to be attached to the frame hanging tool of FIG. 1;

FIG. 5 is a diagrammatic, enlarged, fragmentary, front elevational view of a second end portion of the frame hanging tool of FIG. 1 without inserts;

FIG. 7 is a diagrammatic, perspective view of two interconnected frame hanging tools of FIG. 1 connected at a 90° angle;

FIG. 8 is a diagrammatic, front elevational view of the frame hanging tool of FIG. 1 used in conjunction with fasteners; and FIG. 9 is a diagrammatic, enlarged, fragmentary, front elevational view of the first end portion of a second embodiment of the frame hanging tool.

DESCRIPTION OF THE PREFERRED EMBODIMENTS

Figure 1:
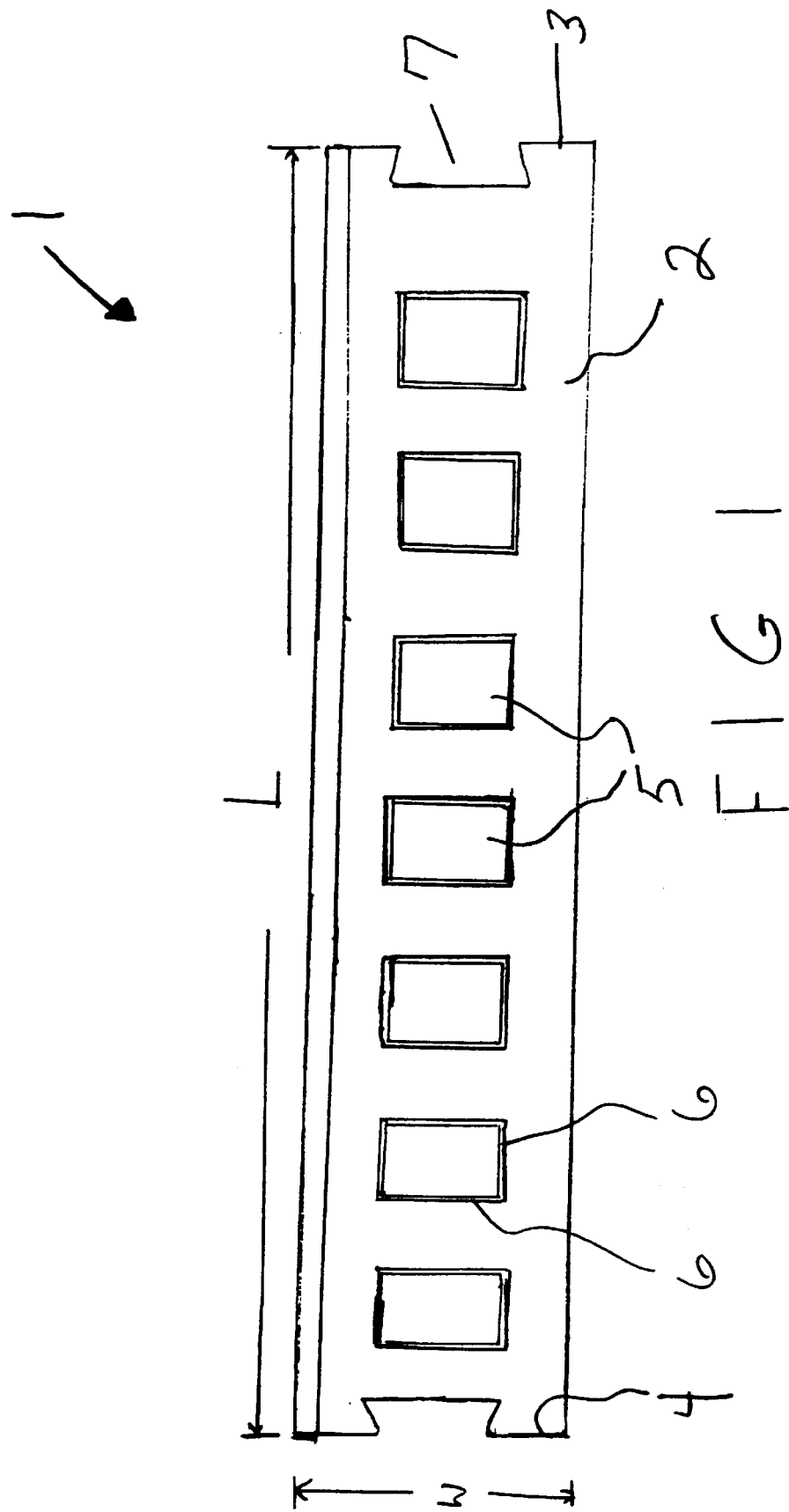
FIG. 1 is a diagrammatic, front elevational view of a frame hanging tool in accordance with the invention.

Referring now to the figures of the drawings in detail and first, particularly, to FIG. 1 thereof, there is shown a frame hanging tool 1 having an elongated body member 2 with a rectangular shape. The body member 2 has a first end 3, a second end 4, a length L, a width W and a non-illustrated thickness. The length L of the body member 2 is arbitrary (i.e., 6 inches to 10 feet), but is preferably a length of 1 foot, 18 inches, 2 feet, 3 feet, and 1 meter. The width W of the body member 2 is arbitrary, but is preferably in the range of 1 to 8 inches. The thickness of the body member 2 is arbitrary, but is preferably in the range of ⅛ inch to 1 inch.

The body member 2 is ideally made out of a lightweight, pliable material that can traverse irregular surfaces. The body member 2 can be made out of various materials including plastic, metal, wood, and composite materials. Although, the frame hanging tool 1 is preferably in a rectangular shape, other shapes such as squares, triangles, circles, irregular rectangles, and the like are possible.

The body member 2 is formed with a plurality of openings 5 that are defined by recessed borders (steps) 6. The openings can be formed of any shape, but are illustrated as rectangular shapes, for example, that can have dimensions of 1 ¼ inches wide by 1½ inches high. Preferably, the openings 5 are square. Also, the openings can be centered with respect to the length L and spaced apart at given intervals. Preferably, for a three foot length, the openings 5 are squares having a side length of less than two inches, the center opening 5 is centered at 18 inches, and the remaining openings are centered at two inch intervals radiating away from the center of the body member 2.

The recessed borders 6 are preferably stepped on one side of the body member 2. Alternatively, the recessed borders 6 can be on both sides of the body member 2 such that the borders take the form of a central flange on the sides within the opening and extending towards the center of each opening.

The body member 2 is also formed with a pair of end openings 7. The end openings 7 can be formed of any shape, but are illustrated in the preferable embodiment of a trapezoid.

Figure 2:
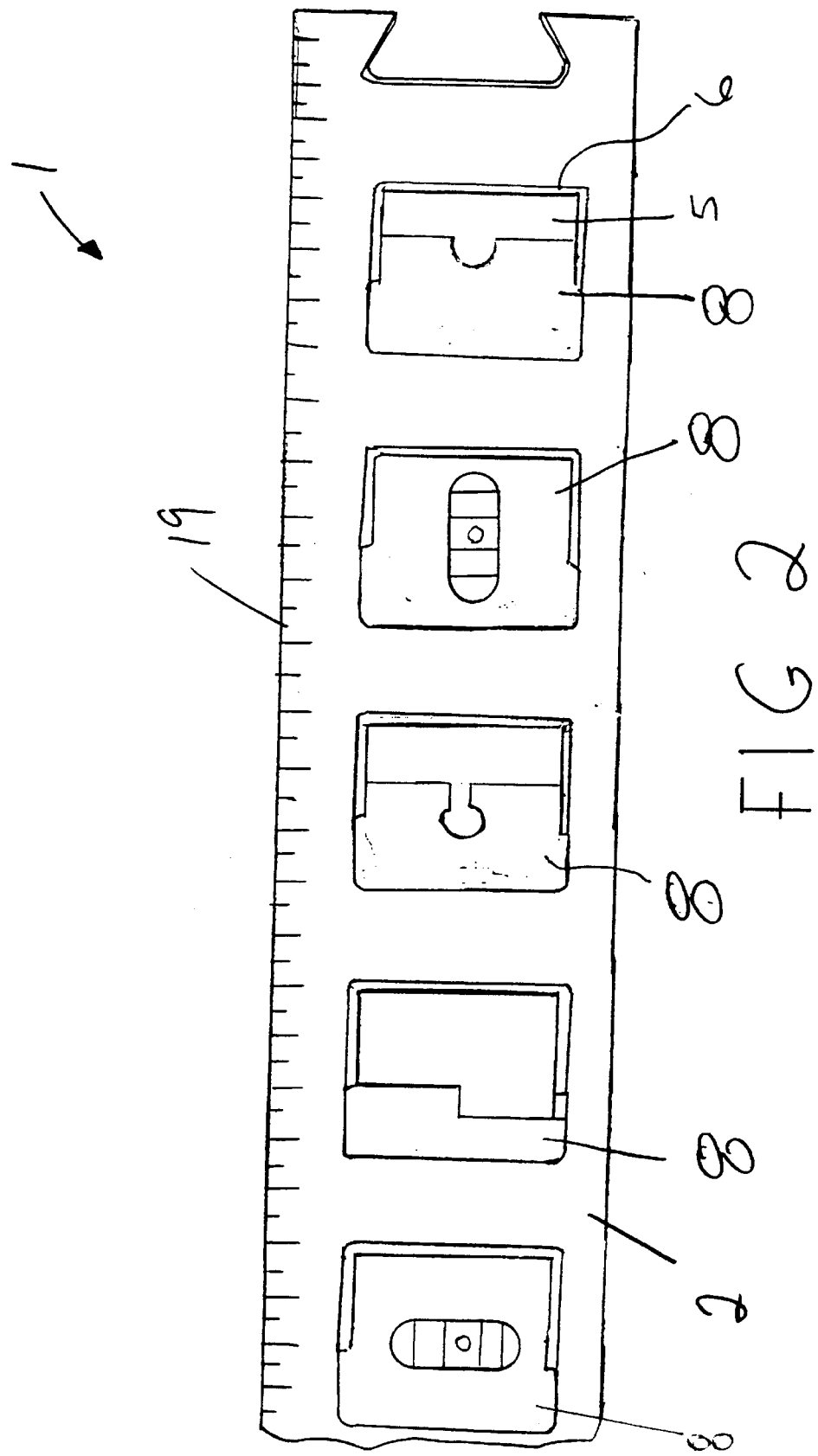
FIG. 2 is a diagrammatic, enlarged, fragmentary, front elevational view of a first end portion of the frame hanging tool of FIG. 1 with inserts.

FIG. 2 shows a plurality of exemplary removable inserts 8 disposed in the openings 5 and held by the recessed borders 6 of the body member 2. Each of the inserts 8 preferably has overhanging edges 14 (see FIGS. 3 and 4) for engaging the recessed borders 6 of the body member 2. The overhanging edges 14 define a corresponding recess on one side and along the entire perimeter of the inserts 8. The recessed borders 6 in the openings 5 and the corresponding recesses around the inserts 8 are formed such that when the inserts 8 are placed into the openings 5 the front and back surfaces of the inserts 8 preferably lie flush with the front and back surfaces of the body member 2.

Alternatively, the recess can be formed on less than the entire perimeter of the inserts 8. Also, the inserts 8 can have a recess on both sides such that each insert 8 has a perimeter with a central flange thereon extending away from the center of the insert 8.

The inserts 8 can be individually removed and placed in any of the openings 5. The inserts 8 can be configured for insertion into the openings 5 from either the left side of the opening or the right side of the opening.

Figures 3, 3A:
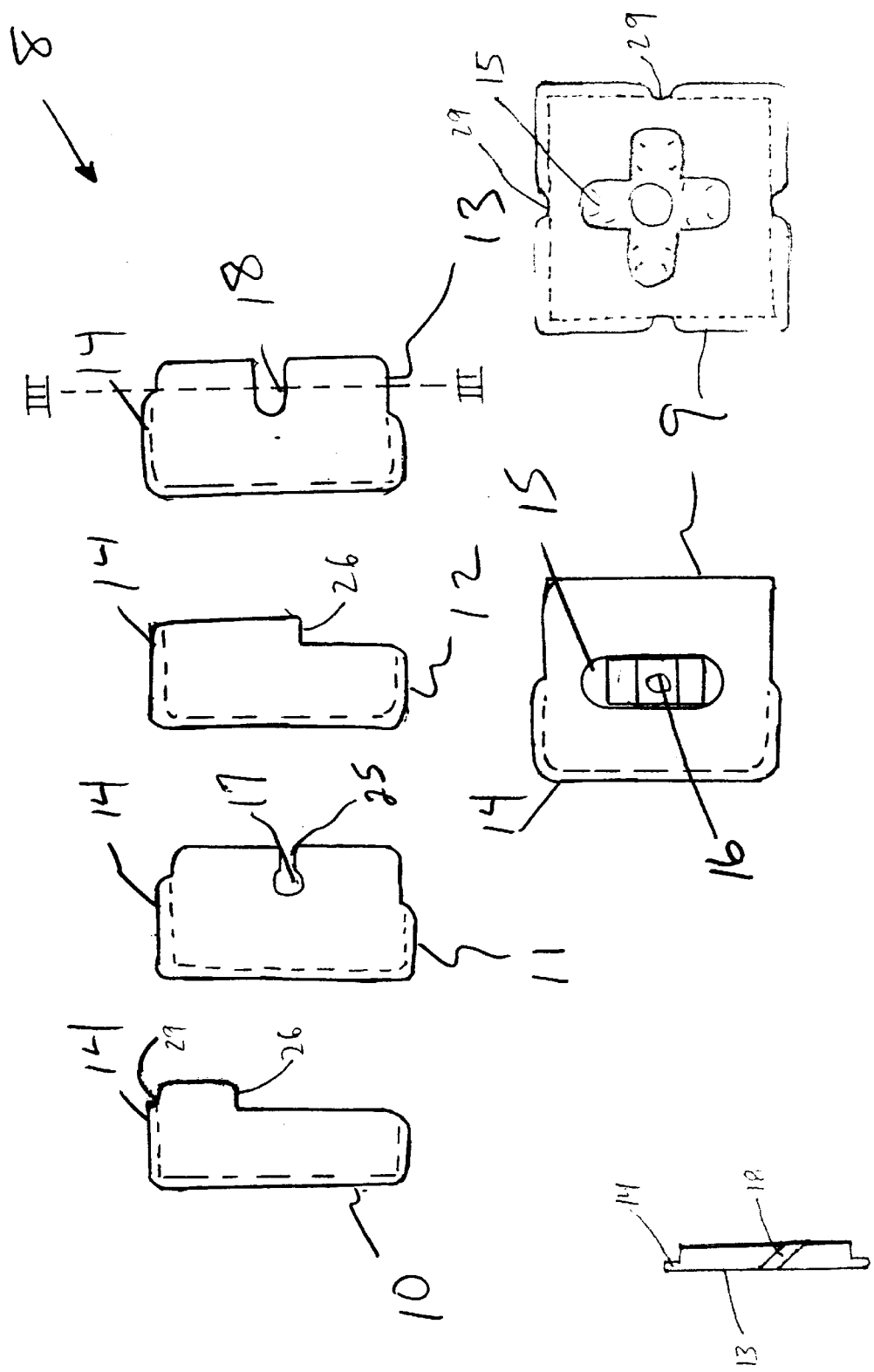
FIG. 3 is a diagrammatic, front elevational view of a plurality of inserts to be attached to the frame hanging tool of FIG. 1.
FIG. 3a is a diagrammatic, side, cross-sectional view of an alternative embodiment of insert 13 of FIG. 3 along the line III—III.

FIG. 3 shows the front side of a plurality of example inserts 8, including two examples of a level insert 9, an L-shaped insert 10, a screw or nail insert 11, a stepped insert 12 and a general fastener insert 13. All of the inserts 9 to 13 are shown with overhanging edges 14 for engaging the recessed borders 6 of the body member 2 with the inside corner of the defined recesses shown with dashed lines.

The level insert 9 has a recess 15 for receiving and securing a level 16. The level 16 can be removable. The recess 15 can be oriented to receive the level 16 in any angular direction or in a plurality of directions. Preferably, the level is oriented in a horizontal direction, in a vertical direction, or on a 45-degree angle.

The L-shaped insert 10 is configured to guide and receive a fastener such as a bull hook. The distance between the step 26 and the corresponding facing interior side of the opening 5 can define the maximum size of the fastener. The L-shaped insert 10 can also take the mirror-image form of the configuration shown in FIG. 3. Forming the L-shaped insert 10 in a mirror image allows customized easier use for a right-handed or left-handed user.

The stepped insert 12 is formed with an arbitrarily positioned step 26 that is also used to receive and guide fasteners such as bull hooks. Because the step 26 can be at any distance between the top and bottom sides of the stepped insert 12, the stepped insert 12 can accommodate various sized fasteners. Alternatively, the insert 12 can be formed without any step such that, for example, a bull hook having a size corresponding to the inside diameter of an opening 5 can be simply placed against the side of the insert 12 (see also insert 32 in FIG. 4). Likewise, the edges of the openings 5 can be used, for example, to install a bull hook having a size corresponding to the inside diameter of an opening 5.

The screw and nail insert 11 is configured with a fastener guide path 25 and an opening 17 for receiving and centering a nail, screw and similar type fasteners. The screw and nail insert 11 can have a keyhole opening as shown in FIG. 3, or can have a semicircular opening as shown in FIG. 2.

The general fastener insert 13 is provided with a U-shaped opening 18 that receives and centers similar and other types of fasteners including pegs, hooks and mollies. It is noted that the openings 17 and 18 can be of various sizes and shapes to fit various types of fasteners and are not limited to those shown in the drawings.

Shown in FIG. 3 are openings 17, 18 in the inserts 8 having a depth that is perpendicular to the plane of the inserts 8, 11, 13. Alternatively, the openings 17, 18 in the inserts 8 can be at any angle transverse to the plane of the inserts 8 as shown FIG. 3a, which is a cross-sectional view taken along a line III—III of the general fastener insert 13 in FIG. 3.

The various inserts 8 permit the frame hanging tool 1 to be adapted to handle any kind of fasteners, including, but not limited to, nails, screws, mollies, hooks, bull hooks, pegs, and the like. For example: insert 31 is configured to receive a fastener, typically referred to as a hardwall picture hanger, that has a shape corresponding to the interior shape of the insert; insert 32 is configured in two parts to receive a bull hook fastener, the most common type of picture hanger; and insert 33 is configured to receive a fastener, typically referred to as a "sturdy hanger" or a "tremor hanger", that has a shape corresponding to the interior shape of the insert. FIG. 4 shows a rear view of these three inserts 31, 32, 33.

FIG. 4 also shows a rear view of some inserts 8 included in FIG. 3. All of the inserts of FIG. 4 have the overhanging edges 14 for engaging the recessed borders 6 of the body member 2. The overhanging edges 14 and the recessed borders 6 are dimensioned such that the overhanging edges 14 of the inserts 8 frictionally self-secure to the recessed borders 6 in the openings 5. The perimeter of the overhanging edges can be formed to be slightly oversized with respect to the size of the openings 5. Also, the overhanging edges 14 facing the recessed borders 6 of the openings 5 can be tapered towards the center of the inserts 8 to permit easier self-securing into the openings 5. The taper 27 is shown, for example, on the level insert 9 of FIG. 4.

The inserts 8 are removed from the openings 5 by applying a force to the inserts 8 in a direction away from the recessed borders 6 to overcome the frictional forces of the slightly oversized overhang edges 14. It is noted that other fastening techniques such as pin and socket devices could be employed for securing the inserts 8 to the body member 2.

FIG. 5 shows an alternative embodiment for the recessed borders 6 of the openings. Preferably, the recessed borders 6 have protrusions 28 that have a thickness corresponding to the depth of the recessed border 6. Alternatively, the thickness of the protrusions 28 can be less or more than the depth of the recessed border 6. The protrusions 28 are illustrated as being curved. The protrusions 28 can take any shape, including, but not limited to, a triangular or rectangular shape. The protrusions 28 are illustrated as extending from the outer edge all the way to the inner edge of the recessed borders 6. The protrusions 28 can extend alternatively to any distance along the edge of the recessed borders 6. Recesses 29 in the inserts 8 for receiving the protrusions 28 are shown, for example, in FIG. 3 on one of the level inserts 9 and the L-shaped insert 10, and in FIG. 4 on inserts 31, 32, 33. Alternatively, the inserts 8 can have the protrusions 28 and the recessed borders 6 can have the recesses for receiving the protrusions 28.

FIG. 5 also shows the frame hanging tool 1 having measuring units 19 embedded into the body member 2. The measuring units assist in measuring the length between two inserts 8 or two fasteners to be inserted into a structure. As shown in FIG. 5, the measuring units 19 start at one end of the body member 2 and form a ruler that runs the entire length L of the body member 2. In addition to being formed directly in the body member 2 as shown in FIG. 2, the measuring unit 19 can be formed on a structural support clip 20 as shown in FIG. 5. The structural support clip 20 can run up to the full length L of the body member 2 and provides support to the body member 2. For example, if the body member 2 is made of plastic, the structural support clip 20 can be formed of a harder plastic, a metal, a metal alloy, aluminum, or other suitable material, and helps prevent the body member 2 from warping or bending.

FIG. 8 shows the frame hanging tool 1 having an additional and/or alternative measuring unit 34 embedded into the body member 2. The measuring unit 34 assists in measuring the length between two inserts 8 or two fasteners to be inserted into a structure. Specifically, the measuring unit 34 enables a user to easily determine a distance between two insert openings, and, therefore, two fasteners to be installed. As shown in FIG. 8, the measuring unit 34 is centered on the body member 2 and forms a ruler that runs the entire length L of the body member 2, the ruler measurements increasing from the center outward. Preferably, the center unit is "0" and the other units are even integers.

In addition to being formed directly in the body member 2 as shown in FIG. 8, the measuring unit 34 can be formed on a structural support clip 20 as shown in FIG. 5.

Figure 6:
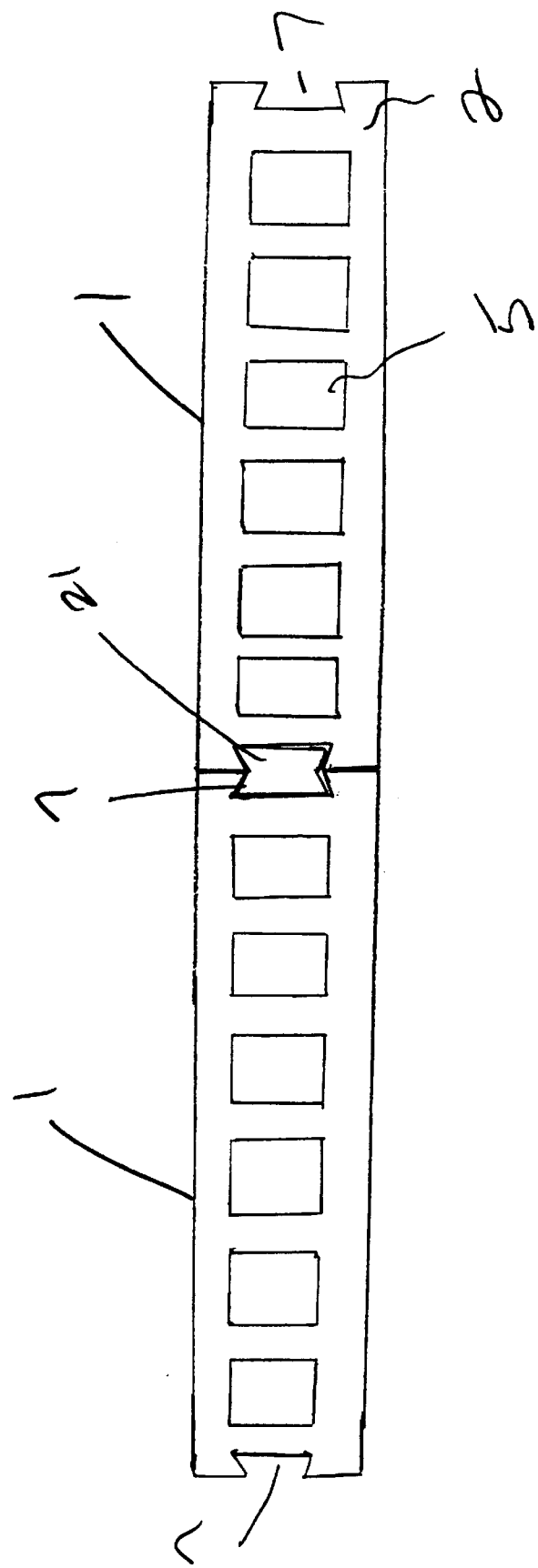
FIG. 6 is a diagrammatic, front elevational view of a set of two interconnected frame hanging tools of FIG. 1.

An end connector 21 is also shown in FIG. 5. The end connector 21 is used to attach adjacent frame hanging tools 1 together as shown in FIG. 6, for example. FIG. 7 shows adjacent frame hanging tools 1 connected at right angles to each other with a right-angled end connector 22. It is further noted that the end connectors 21, 22 can be formed with a hinging means to connect adjacent frame hanging tools 1 at any angle (i.e., 0° to 360°) with respect to one another. In this manner, the frame hanging tool 1 can be used for working in any corner, regardless of the corner angle.

The frame hanging tool 1 is easy to use. First, the type of fastener to be used is determined. For the following example, the fastener will be a nail and two nails will be fastened into a wall level with respect to ground. Then, the appropriate inserts for the type of fastener used (the screw and nail insert 11) are selected and placed into the appropriate positions in the selected openings 5 of the body member 2. One or more leveling inserts 9 can also be placed in the body member 2. In an alternative embodiment shown in FIG. 5. one or more levels 16 can be placed directly in one or more cavities 30 on the body member 2.

Next, a height at which the frame is to be set is determined. A first nail 23, upon which the frame will rest, is secured (nailed) into the structure. One end of the frame hanging tool 1 is set over the first nail 23 (FIG. 8) in the area of the opening 5 not covered by the insert 11. The frame hanging tool 1 is then moved over in the direction of arrow A such that the first nail 23 is now in the opening 17 of the insert 11 in the position shown by reference number 23'.

The frame hanging tool 1 is then pivoted about the first nail 23' until the level 16 in the level insert 9 or in the frame hanging tool 1 indicates that the frame hanging tool 1 is true or level with respect to ground. At this point, the second nail 24 is then placed into the opening 17 of a second insert 11 and secured to the structure. If the nails are to be inserted at an angle with respect to the structure, the screw and nail insert 11 having an inclined opening 18 as shown in FIG. 3a can be used. Alternatively, the opening 17 in the insert 11 can be formed to grip the second nail 24 such that the second nail 24 is held within the opening 17 while the frame hanging tool 1 is pivoted and leveled. The gripping means can include, for example, a grommet with an opening, the grommet being made from a gripping substance such as rubber or soft plastic.

The frame hanging tool 1 is then moved in a direction opposite arrow A such that the first nail is in the position shown by reference numeral 23 and the second nail is in the position shown by reference number 24'. The frame hanging tool 1 is lifted away from the structure leaving two nails in the structure level with respect to ground.

Of course, many different variations for using the frame hanging tool 1 are possible, and this example is only illustrative for understanding the invention.

A third, fourth, or fifth fastener can be aligned from any of the previously inserted fasteners for inserting multiple fasteners for a single item to be hung or for inserting multiple fasteners for a plurality of items to be hung. In addition, it is noted that the frame hanging tool 1 can be placed on a pre-existing fastener already set in the wall.

FIG. 9 shows a second embodiment of the frame hanging tool 1. The second embodiment differs from the first embodiment in that fastener openings 40 are provided in the body member 2. The fastener openings 40 allow the frame hanging tool 1 to be moved in the vertical direction over the fasteners 23 already fastened to a structure. In contrast to the recessed borders of FIGS. 1 to 8, the recessed borders 41 of FIG. 9 only partially surround the openings 5. The fastener openings 40 and the recessed borders 41 could be placed on the opposite side of the openings 5 shown in FIG. 9.

We claim:

1. A frame hanging tool, comprising:
   an elongated body member having a plurality of openings formed therein, each of said plurality of openings having an opening edge and a recessed border formed at least partly around said opening edge; and
   at least one insert for receiving and guiding a fastener to be secured to a structure, said at least one insert having an overhanging edge and being inserted in one of said plurality of openings;
   said recessed border self-securing to said overhanging edge for removably fastening said at least one insert to said body member.

2. The frame hanging tool according to claim 1, wherein said recessed border is formed with at least one protrusion and said overhanging edge is formed with at least one recess aligned with and corresponding to said at least one protrusion for removably fastening said at least one insert to said body member.

3. The frame hanging tool according to claim 2, wherein said recessed border has a depth and said at least one protrusion has a thickness corresponding to said depth of said recessed border.

4. The frame hanging tool according to claim 2, wherein said at least one protrusion and said at least one recess are curved.

5. The frame hanging tool according to claim 2, wherein said at least one protrusion has a width, said recessed border has a breadth, and said width corresponds to said breadth.

6. The frame hanging tool according to claim 1, wherein said overhanging edge has said at least one protrusion and said recessed border has said at least one recess aligned with and corresponding to said at least one protrusion for removably fastening said at least one insert to said body member.

7. The frame hanging tool according to claim 6, wherein said recessed border has a depth and said at least one protrusion has a thickness corresponding to said depth of said recessed border.

8. The frame hanging tool according to claim 6, wherein said at least one protrusion and said at least one recess are curved.

9. The frame hanging tool according to claim 6, wherein said at least one protrusion has a width, said recessed border has a breadth, and said width corresponds to said breadth.

10. The frame hanging tool according to claim 1, wherein said recessed border has a border shape, said overhanging edge has an edge shape, and said border shape substantially corresponds to said edge shape.

11. The frame hanging tool according to claim 1, wherein said recessed border has a border shape, said overhanging edge has an edge shape, and said edge shape is larger than said border shape.

12. The frame hanging tool according to claim 1, wherein said overhanging edge has a tapered corner.

13. The frame hanging tool according to claim 1, wherein said at least one insert has a front side and a back side and said body member has a front side and a back side, an d said front and back sides of said at least one insert respectively lie flush with said front and back sides of said body m ember when said at least one insert is placed into said plurality of openings.

14. The frame hanging tool according to claim 1, wherein said at least one insert is one of a plurality of inserts including a leveling insert having a level for determining if a plurality of fasteners are aligned level with respect to each other and a fastener guiding insert for receiving and aligning one of the plurality of fasteners.

15. The frame hanging tool according to claim 14, wherein said leveling insert has a removable level.

16. The frame hanging tool according to claim 15, wherein said leveling insert has a recess for receiving said level oriented at an angle.

17. The frame hanging tool according to claim 14, wherein said fastener guiding insert has a fastener guide path and a semicircular hole formed therein for receiving and guiding the fastener and said semicircular hole releasably grips the fastener.

18. The frame hanging tool according to claim 1, wherein said elongated body member has at least one cavity and includes at least one level removably disposed in said at least one cavity.

19. The frame hanging tool according to claim 1, wherein said body member has at least one end with an end opening formed therein and including an end connector received in said end opening of each of two adjacent body members for joining said adjacent body members at an angle with respect to one another.

20. The frame hanging tool according to claim 1, wherein said body member has a front side and a back side and said recessed border is formed at least partly around said opening edge on both said front side and said back side of said body member.

21. The frame hanging tool according to claim 1, wherein said body member has an edge and a measurement scale formed on said edge.

* * * * *